United States Patent [19]

Baylor

[11] 4,007,972
[45] Feb. 15, 1977

[54] SEALED TRACK JOINT
[75] Inventor: John M. Baylor, Bettendorf, Iowa
[73] Assignee: J. I. Case Company, Racine, Wis.
[22] Filed: Oct. 1, 1975
[21] Appl. No.: 618,438
[52] U.S. Cl. .................................. 305/11; 277/95
[51] Int. Cl.² ..................................... B62D 55/20
[58] Field of Search ............ 305/58, 11, 58 PC, 14; 277/95, 96.1, 92, 82, 38, 206.1

[56] References Cited

UNITED STATES PATENTS

| | | | |
|---|---|---|---|
| 2,872,219 | 2/1959 | Cobb | 277/95 |
| 3,574,419 | 4/1971 | Hatch | 305/11 |
| 3,680,924 | 8/1972 | Otto et al. | 305/58 X |
| 3,787,098 | 1/1974 | Orr | 305/11 |
| 3,906,746 | 9/1975 | Haines | 277/95 X |
| 3,909,076 | 9/1975 | Kato | 305/11 |

*Primary Examiner*—Robert B. Reeves
*Assistant Examiner*—John P. Shannon
*Attorney, Agent, or Firm*—Arthur J. Hansmann

[57] ABSTRACT

A sealed track joint having a pin and a bushing and links assembled therewith. The links and bushing present a cavity in which an elastomeric seal is disposed and is shown to be of an S-shape in cross section and is compressed into the cavity.

7 Claims, 4 Drawing Figures

SEALED TRACK JOINT

This invention relates to a sealed track joint of the type used in a track for a crawler tractor or the like.

BACKGROUND OF THE INVENTION

The prior art contains disclosures and teachings of sealed track joints for crawler tractors or the like, and examples thereof are found in U.S. Pat. Nos. 2,911,840; 3,336,086; 3,347,602; 3,680,924; and 3,731,551. The last aforesaid patent somewhat epitomizes the prior art to the extent that the prior art discloses a sealed track joint wherein there is an elastomeric seal which is compressed between links and adjacent a bushing surface for sealing at that location in the joint.

The present invention provides an improvement in a sealed track joint in that it presents a sealed joint which effectively and positively provides a seal in a plurality of locations along the path of potential entry of foreign matter into the joint. Further, the present invention provides the seal in a simplified and inexpensive form and wherein the seal is efficient and reliable and has a long life and is also self-adaptable to the surrounding parts of the joint to thus be self-sealing as required and to adjust itself to the movement of the surrounding parts while retaining its efficient sealing function.

More specifically, the sealed joint of this invention provides an elastomeric seal member which presents a plurality of locations of sealing areas along each of the two or more surfaces which are inherently presented in a track joint and along which foreign matter may enter the joint. Accordingly, the track joint of this invention accomplishes the aforementioned objectives and effectively maintains the joint free of foreign matter so that dirt and the like cannot enter the joint. In addition to the desirable results of sealing at two or more locations along any potential entry surface for dirt, the seal of this invention will continue to effectively preclude the entry of dirt even though a portion of the seal were to rupture or to otherwise fail, and such rupture or failure is not at all likely or probable even though the seal is subjected to the usual torsional stresses created by the relative movement of the part surrounding the seal. That is, a track joint commonly has its links pivotal about the axis of the joining pin, and any seal which is disposed in contact with and between the pivoting links is thus subjected to either the sliding action of the links or to the torsional stress induced by the movement of the links. In the present invention, the seal is also arranged to withstand the torsional forces and to avoid failure or rupture in withstanding those forces, and the seal continues to be highly effective in precluding the entry of dirt or the like past the seal even though the seal is disposed between the links moving relative to each other.

Still further, the sealed track joint of the present invention provides an arrangement wherein the seal is automatically and snugly disposed in its effective sealing position in the course of the usual assembly of the joint, namely, the pressing of the track links onto the joint bushing and onto the joint pin. In that assembly process, the seal is automatically positioned and compressed and is consequently retained in its desired and effective sealing position. Also, the joint of this invention is arranged with the seal having the attributes as mentioned above and wherein the seal can withstand torsional stresses, by flexing and adjusting to the movement of the parts in contact with the seal, and, when the movement of the adjacent parts is of a sufficient magnitude, then the seal will again accommodate that movement by retaining its position while the parts slide over the seal, and the seal will still maintain its function and efficient qualities of precluding the entry of contaminants into the joint.

Other objects and advantages will become apparent upon reading the following description in light of the accompanying drawings.

DETAILED DESCRIPTION OF THE PREFERRED EMBODIMENT

Figure 1:
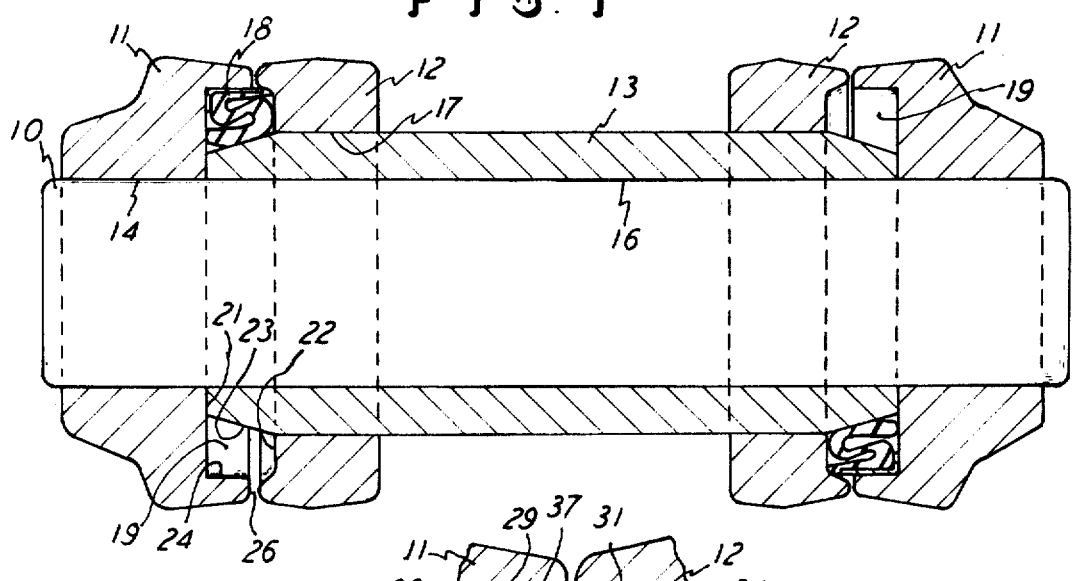
FIG. 1 is a sectional view along the axis of a sealed track joint of this invention.

FIG. 1 shows the assembled track joint of this invention which includes the track pin 10, a track link 11, a track link 12, and a cylindrical bushing 13. The pin 10 is commonly arranged to form the axis of the joint which extends along the longitudinal axis of the pin 10, and the outer track link 11 is pressed onto the pin 10 to have a pressed fit along the inner diameter 14 of the link 11. The cylindrical bushing 13 extends over the intermediate length of the pin 10, as shown, and the bushing inner circumference 16 is movable relative to the pin 10 to pivot or rotate on the pin 10, in the usual arrangement and manner. Finally, the track link 12 is pressed onto the outer circumference of the bushing 13 to have the link inner circumference 17 in a pressed fit with the bushing 13.

Therefore, in the assembly of the joint shown in FIG. 1, the two links 12 are pressed onto the bushing 13 and the two links 11 are pressed onto the pin 10, and thus the contact surfaces 14 and 17 each provide a tight and dirt-free fit with their respective adjacent pin 10 and bushing 13. With this arrangement, the track joint is articular about the longitudinal axis of the pin 10, and the links 11 and 12 therefore pivot or move relative to each other, both in the usual pivotal action of the joint during the common use of the track chain itself and when the track chain is rolled up or in a snug and compact position. That is, in the usual use of the track chain, the links 11 and 12 may articulate or pivot relative to each other up to an angle of some maximum value, and twenty degrees is mentioned for purposes of this disclosure. However, when the track chain is not in its assembled position on a tractor or the like, but the chain is in a compact or coiled condition, then the angulation between the links 11 and 12 may be greater than the twenty degrees mentioned. The significance of commenting about the maximum angulation is hereinafter elaborated upon with respect to the seal itself which is designated 18 and is disposed in a cavity designated 19 and defined by spaced-apart and facing surfaces 21 and 22 on the links 11 and 12, respectively. Also, the seal cavity 19 is defined by the end of the bushing 13 which is conically-shaped and designated 23, and by a circular surface 24 extending on the outer link 11. The links 11 and 12 are further shown to be slightly spaced apart at the spacing designated 26, and it is this space through which contaminants and foreign matter and dirt and the like can enter the seal and get to the contact area between the pin 10 and the bushing 13, that is along the bushing interior circular surface 16. Of course, due to the press fit at the surfaces 14 and 17, the contaminants, dirt, and foreign matter cannot enter the joint along those areas.

Figure 2:
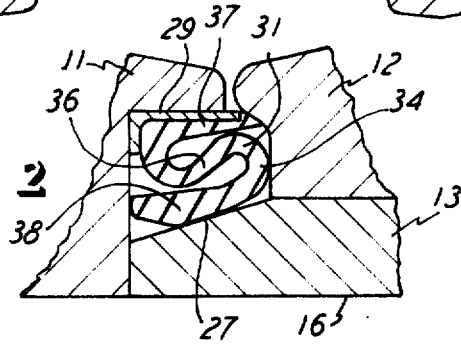
FIG. 2 is an enlarged view of a fragment of the joint shown in FIG. 1.
Figure 3:
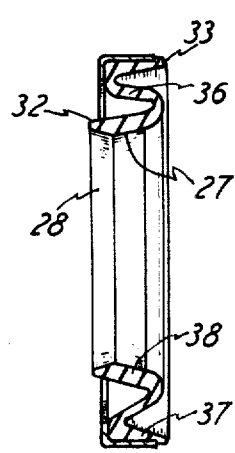
FIG. 3 is a sectional view of the seal of this invention prior to being assembled in the joint.
Figure 4:
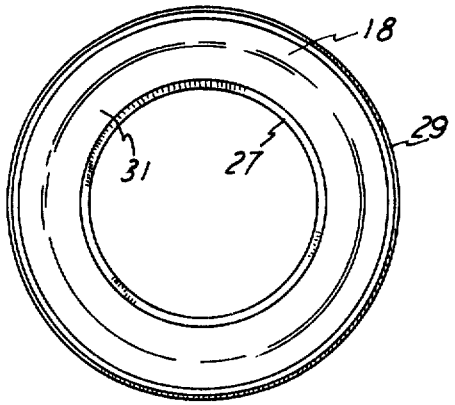
FIG. 4 is an axial elevational view of the seal shown in FIG. 3.

FIG. 1, along with the showings in FIGS. 2, 3, and 4, shows the seal 18 is of a generally circular shape to be pressed into the cavity 19 and to extend endlessly around the bushing conical surface 23 and in snug contact with the link surfaces or walls 21 and 22. That is, FIG. 4 shows the endless circular configuration of the seal 18, and the other three views show the cross-sectional shape and construction of the seal 18 which is shown to be of an S-shape. Therefore, the entire joint is assembled by the pressing of the links 11 and 12 onto the pin 10 and bushing 13, respectively, and as mentioned above, and the seal 18 is disposed in the portion of the cavity 19 within the confines of the link circular wall 24 so that the bushing conical surface 23 slides along the seal inner circumference designated 27 as the bushing 13 and the seal 18 move relatively axially to each other into the final assembled position shown in FIGS. 1 and 2. Thus, the seal 18 is shown to be of an elastomeric material, such as rubber or plastic or the like, and it has its internal circumference 27 of a size slightly less than the corresponding circumference of the bushing conical portion 23, when the seal 18 is in the unassembled position shown in FIG. 3, and thus the seal 18 is pressed and compressed radially outwardly by the bushing conical surface 23 in the assembled position. Also, the bushing 18 has its circumference 27 of a conical shape, and it also has its portion 28 adjacent the circumference 27 of a conical shape but opposite to that of the portion 27, as best shown in FIG. 3. Therefore, the seal conical inner circular portion 27 is, along its entire axial length, in full and flat contact with the bushing conical surface 23, as best seen in FIG. 2. Therefore, at that area defined by the conical surface 27 and the corresponding length of the bushing conical surface 23, the seal 18 is in flat and firm sealing relationship with the bushing 13 to thereby preclude the entry or passage of contaminants along the surface 23.

Further, the bushing 18 has a circular or ring portion 29 which is of a metal or other rigid material which is not elastic, and the ring is affixed, such as by bonding or cementing, to the outer circumference of the elastomeric portion of the seal 18 to extend endlessly therearound. The ring 29 is of an angle shape in cross-section, as seen in FIG. 2, for instance, and it extends in snug contact with the link circular wall 24 and the flat surface 21, as shown. The seal portion or ring 29 therefore is pressed into the link 11 and forms a seal along the contact surfaces mentioned, and the ring 29 supports and locates the elastomeric seal portion now designated 31.

Finally, in the unassembled position of the seal 18, the seal ends 32 and 33, as shown in FIG. 3, extend to the axially outermost limits of the seal 18. Thus, when the seal is in its assembled and compressed position shown in FIGS. 1 and 2, the seal tips or ends 32 and 33 are in respective compressed and sealing relationship with the surfaces 21 and 22. Also, the seal 18 has a portion 34 which is pressed against the surface 22 in the final assembled position, by virtue of the spacing between the surfaces 21 and 22 being less than the free body or unassembled dimension between the seal ends 32 and 33. Therefore, the seal 18 is of a free body dimension in the direction along the central or longitudinal axis of the seal, that is between its tips 32 and 33, and it is also of a radial dimension thereat relative to its cross-sectional S shape, such that those two dimensions are greater than the respective dimensions of the joint elements which define the limits of the cavity 19. That is, the seal 18 is thus compressed both longitudinally and radially to form the sealing contacts and areas described above and thereby prevent the contaminants from passing between the links 11 and 12 and to the pin 10.

Still further, the seal 18 has its central portion which is designated 36 extending integrally and continuously with the seal leg portions which are designated 37 and 38, and the central portion 36 serves as a membrane or an adjustable portion which accommodates relative movement between the leg portions 37 and 38. That is, when the track lines 11 and 12 pivot relative to each other in the normal use of the track joint, the seal leg portions 37 and 38 will remain in contact with their adjacent track elements, along with the seal ring portion 29, and the seal intermediate portion 38 will flex to permit the retention of the fixed and sealing relationship of the seal leg portions 37 and 38 with the adjacent joint elements, as mentioned. However, if the links 11 and 12 were to pivot beyond a maximum angulation, and twenty degrees is mentioned for purposes of this disclosure and discussion, then the seal 18 would be capable of sliding relative to an adjacent track element, such as having the seal leg 38 slide relative to the bushing 13.

The seal 18 is therefore made of an elastomeric material which is compressed into a smaller sized cavity 19, and the seal is described and claimed as being of a serpentine shape which is also shown to be S-shaped. The seal therefore has two or more sealing areas or locations along the two possible paths of entry of contaminants, namely, along the link circular surface 24 and 21, and that is accomplished by the seal ring 29 and the seal tip 32, and it also precludes movement of contaminants along the surface 22 and the conical surface 23, and that is accomplished by the seal tip 33 and the portion 34 and the seal conical surface 27 which is of the same conical diameter and angulation as the bushing conical surface 23.

The internal diameter of the seal 18 is thus stretched over the bearing conical end 23, and the conical end 23 induces a horizontal component of force on the seal surface 27 for pressing the seal into its assembled position, as mentioned, and the angulation of the conical surface 23 is such that it induces the seal tip 32 to bear against the surface 21 since the cone 23 is faced toward the tip 32. Also, the seal internal diameter defined by the surface 27 will remain in a fixed position relative to the cone 23 in the normal use of the chain, and the remainder of the elastomeric portion of the seal will simply flex to accommodate the chain articulation. However, sufficient articulation of the chain will cause the seal to slip when the articulating forces overcome the coefficient of friction of the seal against the cone 23.

What is claimed is:

1. In a sealed track joint, a track pin, a cylindrical bushing extending over said pin and presenting a cylindrical contact area therebetween, a pair of track links on each respective end of said pin and said bushing for presenting an assembly of said links and said pin and said bushing, said links having surfaces facing each other along the axis of said assembly and being spaced apart relative to the axis of said assembly, and said assembly having circumferential and radially spaced-apart surfaces, with all said surfaces presenting a seal cavity, an elastomeric seal compressed in said cavity, the improvement comprising said seal being an endless ring and of an S-shape in cross section with two end leg portions respectively disposed radially inwardly and outwardly relative to the longitudinal axis of said ring, the two extending ends of said leg portions being in abutment with the respective said link surfaces, and the radially inwardly and outwardly disposed two said leg portions being in abutment with the respective said radially spaced-apart surfaces, and said two extending ends when in the free body unassembled position away from said assembly being spaced apart a distance greater than the spacing between said link surfaces, to be compressed therebetween in the assembly, and the radially inwardly and outwardly disposed two said leg portions when in the free body unassembled position away from said assembly being disposed to present an overall height of said S-shape greater than the radial dimension between said radially spaced-apart surfaces, to be compressed therebetween in the assembly.

2. The sealed track joint as claimed in claim 1, wherein said seal includes a ring of non-elastic material affixed to the outer circumference of the radially outward leg, and said non-elastic ring being press-fitted into said cavity.

3. The sealed track joint as claimed in claim 1, wherein said bushing has a circular surface extending adjacent said cavity to define the radially inner limit of said cavity, said seal extending into abutment with said circular surface to be dirt-sealing snug therewith.

4. The sealed track joint as claimed in claim 1, wherein said S-shaped seal includes a curved portion intermediate said two leg portions, and with said curved portion being in abutment with one of said link surfaces for sealing therewith.

5. A sealed track joint comprising a track pin, a cylindrical bushing extending over said pin and presenting a cylindrical contact area therebetween, a pair of track links on each respective end of the assembled said pin and said bushing, said links having surfaces facing each other and being spaced apart relative to the axis of said pin to present a seal cavity between said links, and a circularly-shaped seal of elastomeric material and disposed in said cavity and having a free body size greater than the size of said cavity, to be under compression in said cavity, said seal being serpentine in cross-sectional shape and having opposite ends in respective compressed contact with said surfaces for sealing against entry of matter through said cavity and along said surfaces, said bushing having a conically-shaped end extending adjacent said cavity to define the radially inner limit of said cavity, said seal extending into abutment with said conically-shaped end to be dirt-sealing snug therewith, said conically-shaped end being of an outer diameter greater than the inner diameter of said seal before all of the aforesaid elements are assembled together, and said conically-shaped end extending axially beyond one of said links relative to the longitudinal axis of said pin, and said conically-shaped end being of a reduced cross-sectional dimension at the axially outer end thereof, for sliding into said seal and against the inner circumference thereof during the assembly of all the aforesaid elements.

6. The sealed track joint as claimed in claim 5, wherein the serpentine cross-sectional shape of said seal is S-shaped.

7. The sealed track joint as claimed in claim 6, wherein said seal includes a ring of non-elastic material affixed to the outer circumference of the elastomeric material and disposed in abutment with one of said links.

* * * * *